(12) United States Patent
Nordin

(10) Patent No.: US 10,776,428 B2
(45) Date of Patent: Sep. 15, 2020

(54) SYSTEMS AND METHODS OF RETROSPECTIVELY DETERMINING HOW SUBMITTED DATA TRANSACTION REQUESTS OPERATE AGAINST A DYNAMIC DATA STRUCTURE

(71) Applicant: Nasdaq Technology AB, Stockholm (SE)

(72) Inventor: Jonas Nordin, Sigtuna (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 279 days.

(21) Appl. No.: 15/896,875

(22) Filed: Feb. 14, 2018

(65) Prior Publication Data
US 2018/0232462 A1 Aug. 16, 2018

Related U.S. Application Data

(60) Provisional application No. 62/459,711, filed on Feb. 16, 2017.

(51) Int. Cl.
*G06F 16/903* (2019.01)
*G06F 16/2458* (2019.01)
(Continued)

(52) U.S. Cl.
CPC ...... *G06F 16/90348* (2019.01); *G06F 9/5005* (2013.01); *G06F 11/00* (2013.01);
(Continued)

(58) Field of Classification Search
CPC .......... G06F 16/90348; G06F 16/2465; G06F 11/00; G06F 9/5005; G06F 2201/835; G06F 2201/84
See application file for complete search history.

(56) References Cited

U.S. PATENT DOCUMENTS 5,278,982 A * 1/1994 Daniels .............. G06F 11/1471
6,205,561 B1 * 3/2001 Santerre ............. G06F 11/0769
713/1
(Continued)

FOREIGN PATENT DOCUMENTS

CN 105024879 11/2015
WO 2011031459 3/2011
(Continued)

OTHER PUBLICATIONS

International Search Resort in Application No. PCT/SE2018/050151, dated Jun. 5, 2018 (6 pages).
(Continued)

*Primary Examiner* — Phuong Thao Cao
(74) *Attorney, Agent, or Firm* — Nixon & Vanderhye P.C.

(57) ABSTRACT

A computer system is provided for retrospectively processing a data structure that includes a plurality of entries. The computer system determines if certain data transactions requests that have been recorded in the data structure could have been executed differently (e.g., by being processed at an earlier point in time). For a given entry in the data structure, the system determines if data transaction request could have at least partly succeeded against a prior recorded state of at least one of two ordered lists of pending data transaction requests. Another entry is then found that caused the initial entry to fail in execution and a time delta is stored between the timestamp of the another entry and the timestamp of the initial entry.

20 Claims, 6 Drawing Sheets

(51) Int. Cl.
G06F 11/00 (2006.01)
G06F 9/50 (2006.01)

(52) U.S. Cl.
CPC .... G06F 16/2465 (2019.01); G06F 2201/835 (2013.01); G06F 2201/84 (2013.01)

(56) References Cited

U.S. PATENT DOCUMENTS

| | | | |
|---|---|---|---|
| 7,562,351 B2* | 7/2009 | Haas | G06Q 10/00 |
| | | | 714/48 |
| 8,626,637 B1* | 1/2014 | Gooch | G06Q 40/06 |
| | | | 705/35 |
| 9,189,641 B2* | 11/2015 | Syben | G06F 16/125 |
| 9,400,728 B2 | 7/2016 | Pattnaik | |
| 9,838,277 B2 | 12/2017 | Raney | |
| 2005/0289540 A1 | 12/2005 | Nguyen et al. | |
| 2006/0282366 A1* | 12/2006 | Lutnick | G06Q 40/04 |
| | | | 705/37 |
| 2008/0002703 A1 | 1/2008 | Tripathi | |
| 2008/0104608 A1 | 5/2008 | Hyser et al. | |
| 2009/0037498 A1* | 2/2009 | Mukherjee | G06F 9/5005 |
| 2009/0037910 A1* | 2/2009 | Dantzig | G06F 9/5027 |
| | | | 718/100 |
| 2012/0011100 A1* | 1/2012 | Yamane | G06F 16/2471 |
| | | | 707/649 |
| 2013/0006828 A1* | 1/2013 | Dale | G06Q 40/04 |
| | | | 705/37 |
| 2013/0283266 A1 | 10/2013 | Baset | |
| 2014/0064056 A1 | 3/2014 | Sakata | |
| 2015/0032590 A1 | 1/2015 | Fay et al. | |
| 2015/0073967 A1* | 3/2015 | Katsuyama | H04L 47/12 |
| | | | 705/37 |
| 2015/0073970 A1* | 3/2015 | Merold | G06Q 40/04 |
| | | | 705/37 |
| 2015/0081508 A1* | 3/2015 | Schwall | G06Q 40/04 |
| | | | 705/37 |
| 2015/0095260 A1 | 4/2015 | Ma et al. | |
| 2015/0212892 A1* | 7/2015 | Li | G06F 9/3863 |
| | | | 707/649 |
| 2015/0263900 A1 | 9/2015 | Polyakov | |
| 2015/0339572 A1 | 11/2015 | Achin | |
| 2015/0381505 A1 | 12/2015 | Sundararaman | |
| 2016/0019076 A1* | 1/2016 | Lawler | G06F 9/466 |
| | | | 718/1 |
| 2016/0094413 A1 | 3/2016 | Jain | |
| 2016/0104242 A1* | 4/2016 | Melton | G06Q 40/04 |
| | | | 705/37 |
| 2016/0154662 A1 | 6/2016 | Choi | |
| 2016/0283599 A1* | 9/2016 | Zonabend | G06Q 10/087 |
| 2016/0292011 A1 | 10/2016 | Colson | |
| 2016/0292672 A1* | 10/2016 | Fay | G06Q 20/363 |
| 2017/0004563 A1* | 1/2017 | Noviello | G06Q 40/04 |
| 2017/0193534 A1* | 7/2017 | Marshall | G06Q 30/0201 |
| 2017/0193602 A1* | 7/2017 | Studnitzer | G06Q 40/04 |
| 2018/0004559 A1 | 1/2018 | Geml | |
| 2018/0165173 A1* | 6/2018 | Lin | G06F 11/3476 |
| 2018/0232462 A1* | 8/2018 | Nordin | G06F 9/5005 |
| 2019/0034452 A1* | 1/2019 | Kavanagh | G06F 16/1734 |

FOREIGN PATENT DOCUMENTS

| | | |
|---|---|---|
| WO | 2012/049613 | 4/2012 |
| WO | 2013/061217 | 5/2013 |
| WO | 2016/146846 | 9/2016 |

OTHER PUBLICATIONS

Written Opinion of the International Searching Authority, in Application No. PCT/SE2018/050151, filed Jun. 5, 2018 (9 pages).
Nunes, A. et al., AJITTS: Adaptive Just-In-Time Transaction Scheduling, IFIP International Federation for Information Processing, LNCS vol. 7891, pp. 57-70, 2013.
Notification of Transmittal of the International Search Report and The Written Opinion of the International Searching Authority, or the Declaration in International Application No. PCT/SE2018/050152 dated Apr. 18, 2018 (15 pages).
Non-final Office Action for U.S. Appl. No. 15/896,857, dated Oct. 7, 2019.

* cited by examiner

SYSTEMS AND METHODS OF RETROSPECTIVELY DETERMINING HOW SUBMITTED DATA TRANSACTION REQUESTS OPERATE AGAINST A DYNAMIC DATA STRUCTURE

CROSS REFERENCE(S) TO RELATED APPLICATION(S)

This application claims priority to U.S. Provisional Application No. 62/459,711, filed Feb. 16, 2017, the entire contents of which are hereby incorporated by reference. This application also incorporates by reference U.S. Provisional Application No. 62/459,722, filed Feb. 16, 2017 and an application titled "METHODS AND SYSTEMS OF SCHEDULING COMPUTER PROCESSES OR TASKS IN A DISTRIBUTED SYSTEM" U.S. application Ser. No. 15/896,857 filed on the same date of the instant application.

TECHNICAL OVERVIEW

The technology described herein relates to processing data transaction requests against a data structure. More particularly, the technology described herein relates to retrospectively analyzing a dynamic data structure to determine how previously submitted data transaction requests could be been executed against the data structure.

INTRODUCTION

Vast quantities of electronic data are generated every day in many different technical areas. From weather data, to traffic data, to readings that control a power grid, to billions of electronic transactions that occur on electronic exchanges. While the sources of data may be different, they all share a common problem—namely that analyzing the extremely large data sets from these sources can be a computationally intensive problem. This is especially relevant when there is a finite amount of time for analysis of the data.

An area of interest in analyzing data sets includes retrospectively analyzing data sets to determine if an outcome would change if the entries or records within the data set occurred in a different order. For example, retrospective analysis of data from a power grid may determine if there was an earlier time a shut-down command could have been issued to a particular power grid section. Or analyzing if traffic flow could be improved by changing a speed limit on a highway or the timing of a particular traffic light. Or determining if an unfulfilled electronic order could have been fulfilled if it had been submitted 15 milliseconds earlier. The type of analysis involved in answering such questions can help to identify problems and/or opportunities for improvement.

Accordingly, it will be appreciated that new and improved techniques, systems, and processes are continually sought after for analyzing data sets, searching data sets, and/or reviewing data structures in a retrospective manner.

SUMMARY

A computer system is provided for processing a data structure (e.g., a data set) that includes a plurality of entries. Each entry may correspond to a state change of one of two ordered lists (e.g., an order book) that is maintained or used by a matching engine that matches contra-side data transaction requests to each other. Some of the entries may include an aggregated snapshot of the order book at the time of the state change along with the particular action that caused the state change of the order book. A processing system is then configured to select one of the entries that includes an order that failed to match. The processing system then determine the closest (in time) entry that includes an order book snapshot for which that failed order could have matched against. The processing system then selects a third entry that includes data that reflects a state change in the order book that prevented the initial match. A time delta between the third entry and the first entry is recorded along with an amount that could have been matched and the type of order associated with the third entry.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Certain example embodiments relate to analyzing and determining how submitted data transaction requests that failed (or partly failed in certain instances) could have been processed against a data structure if the data transaction request had been submitted at an earlier point in time. In certain example embodiments, a retrospective process is performed that walks back along a temporally annotated data structure (e.g., a time line of order book actions) to locate certain types of data transaction requests (e.g., an immediate or cancel order, also known as an IOC order). The process then determines whether or not that data transaction request could have been partly or fully processed had it been submitted at an earlier time (e.g., 50 milliseconds earlier) in the order book timeline.

Figure 1:
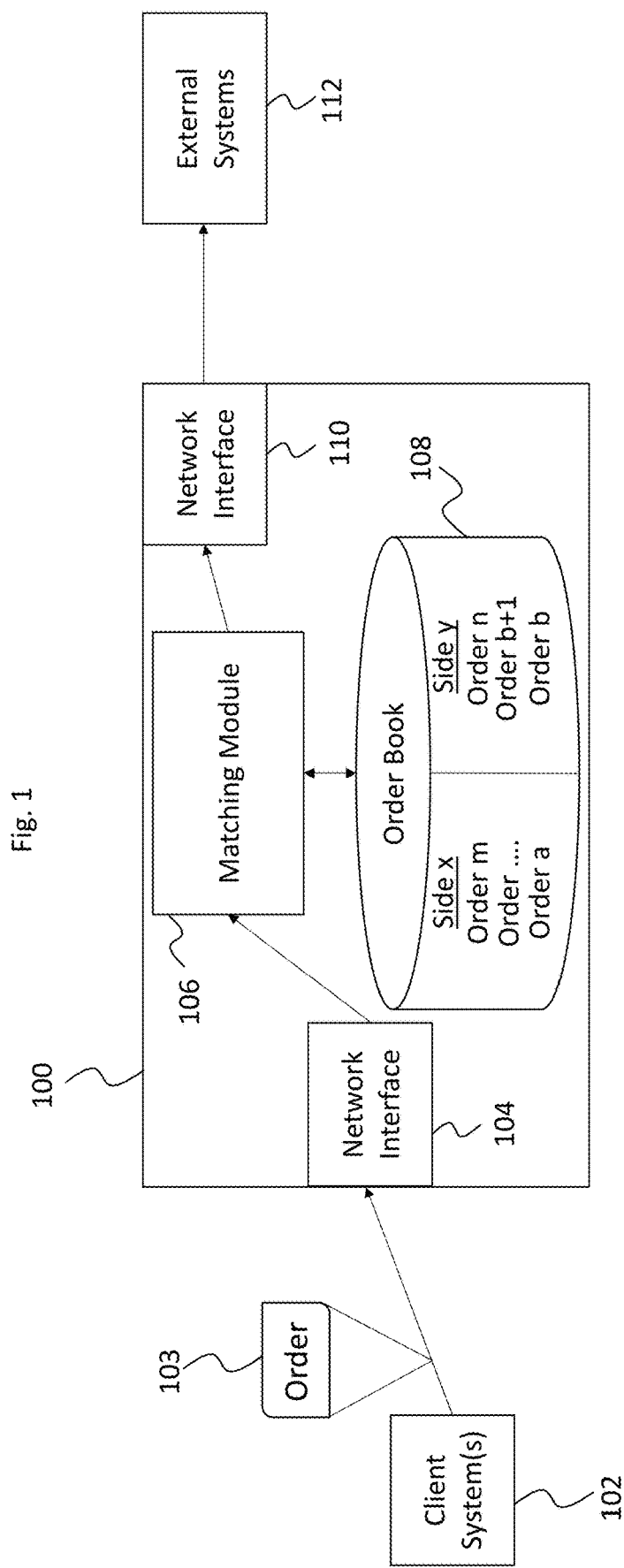
FIG. 1 shows an example exchange computer system according to certain example embodiments.
Figure 2:
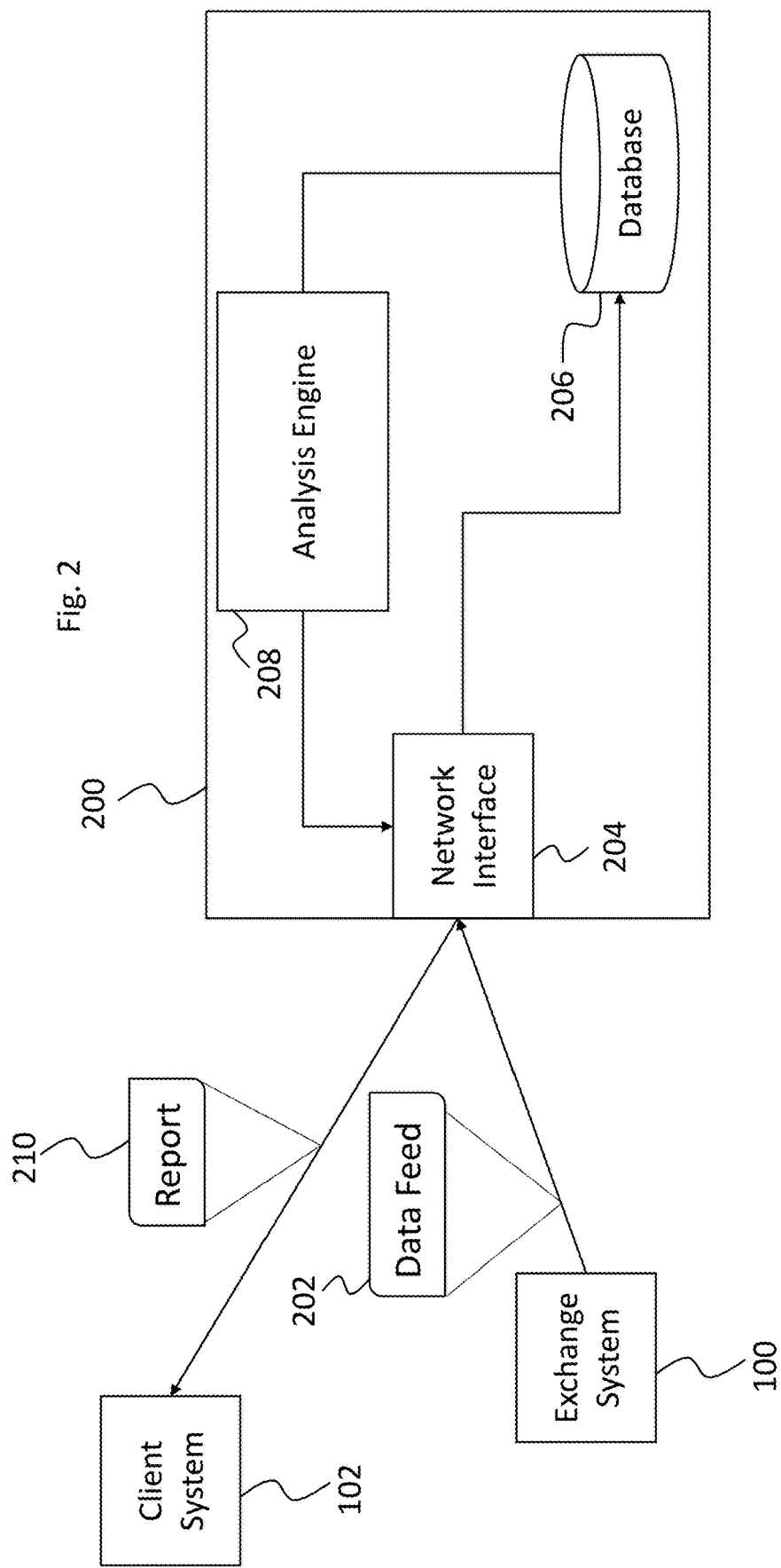
FIG. 2 shows an example analysis computer system according to certain example embodiments.
Figure 3:
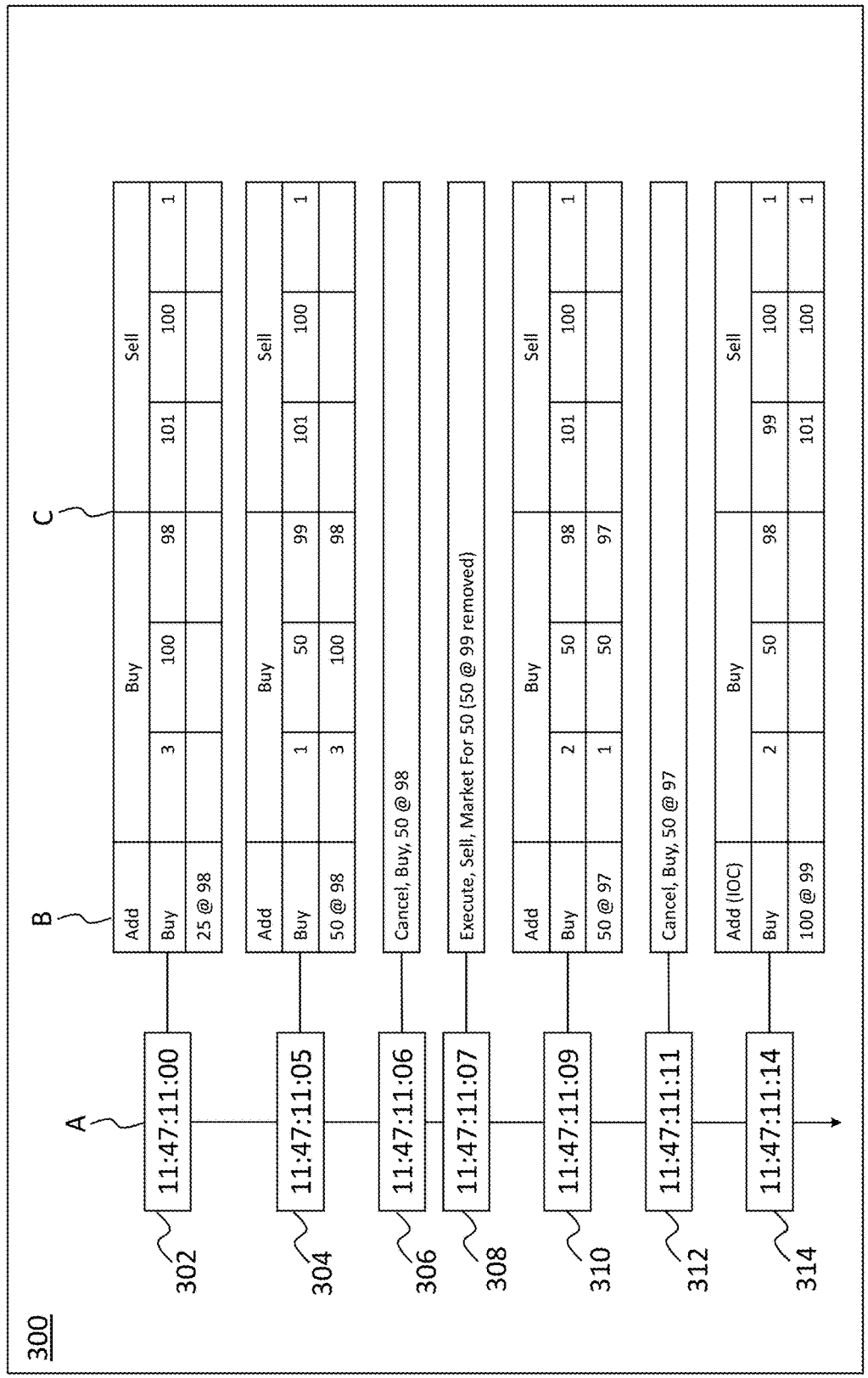
FIG. 3 shows an example dynamic data structure that may be analyzed using the system shown in FIG. 2 according to certain example embodiments.
Figure 4:
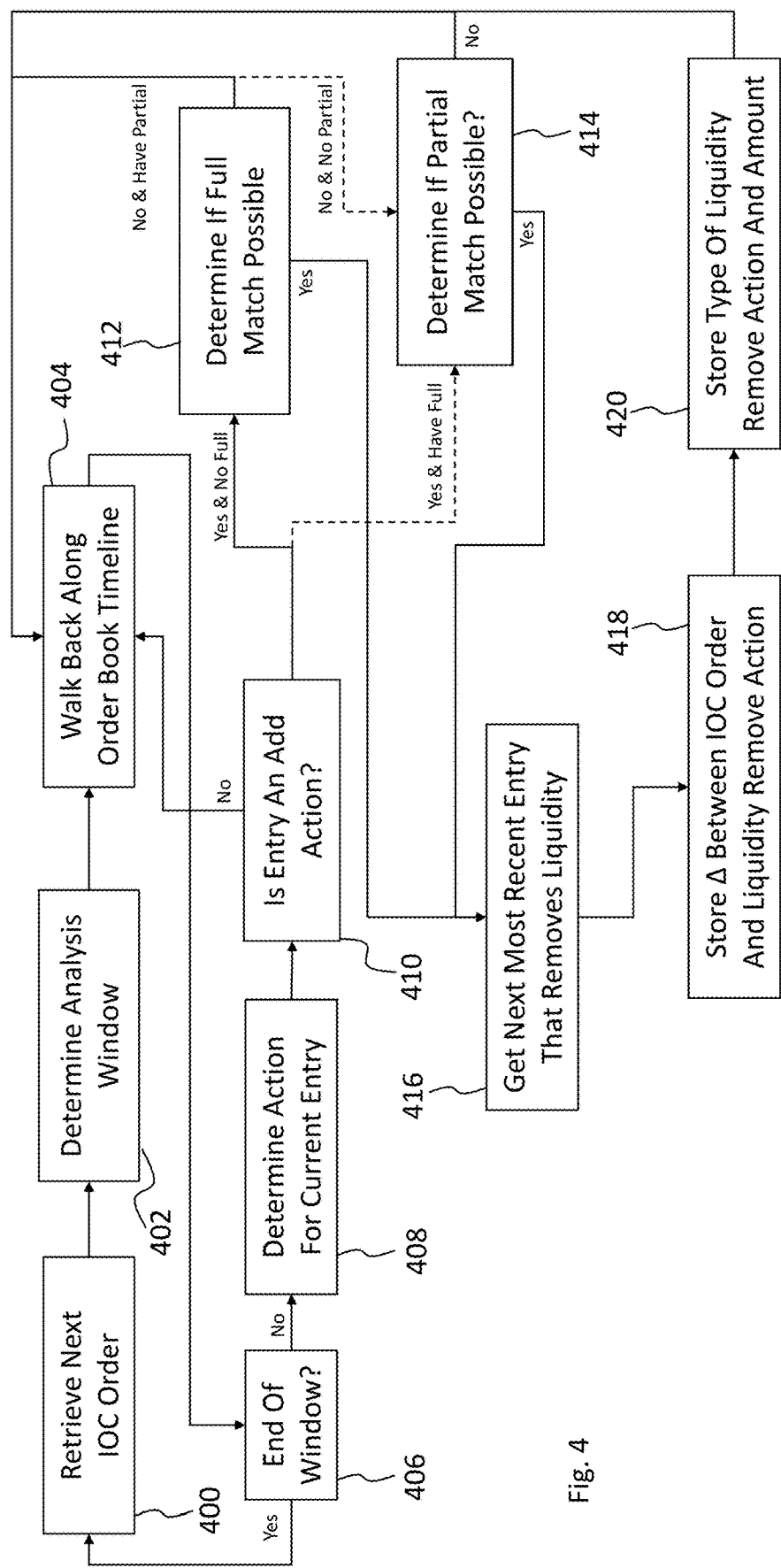
FIG. 4 is a flow chart showing a process that may be implemented on the analysis computer system shown in FIG. 2 according to certain example embodiments.
Figure 5:
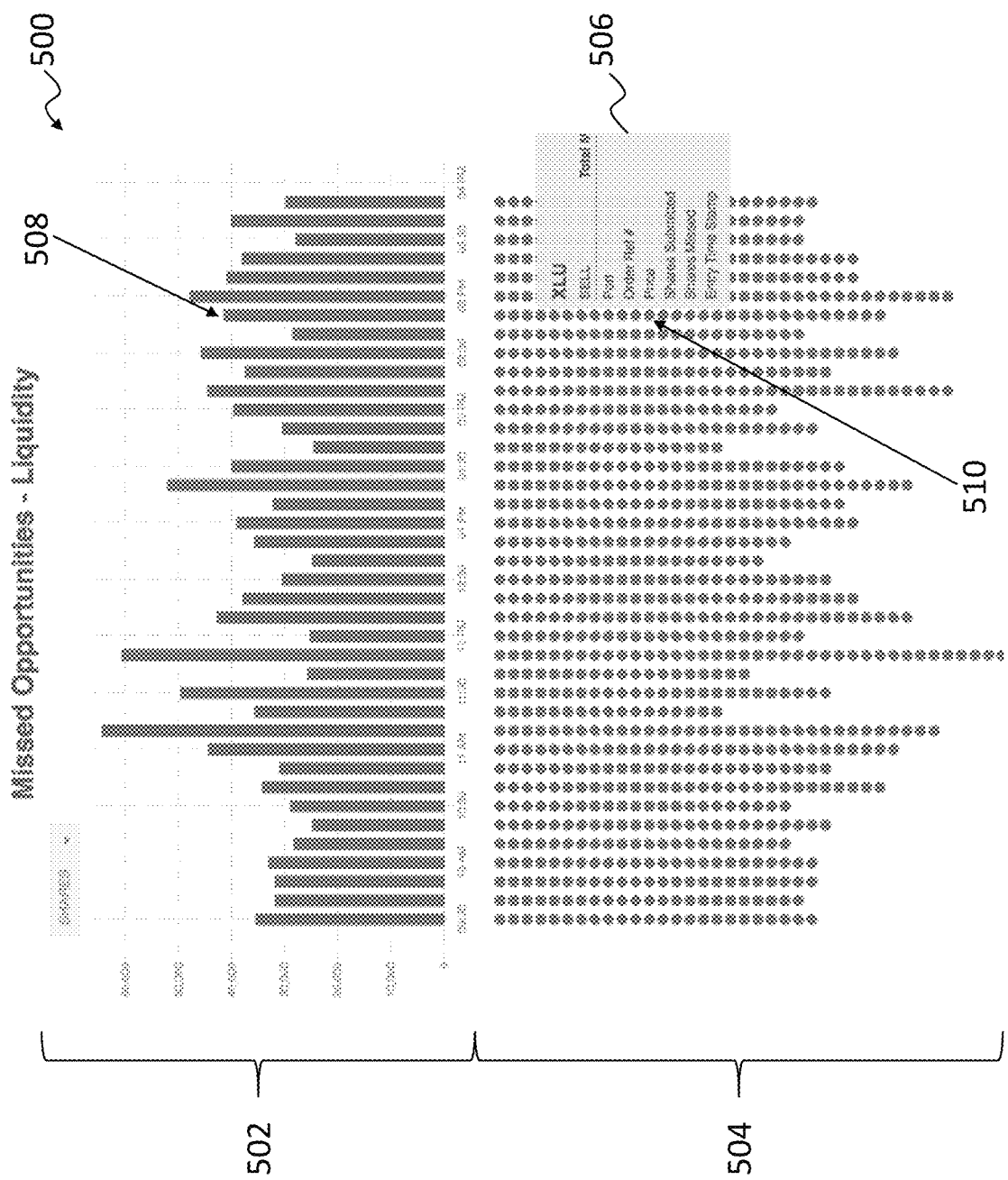
FIG. 5 is a screen shot of an example report that may be generated using the process shown in FIG. 4 according to certain example embodiments.
Figure 6:
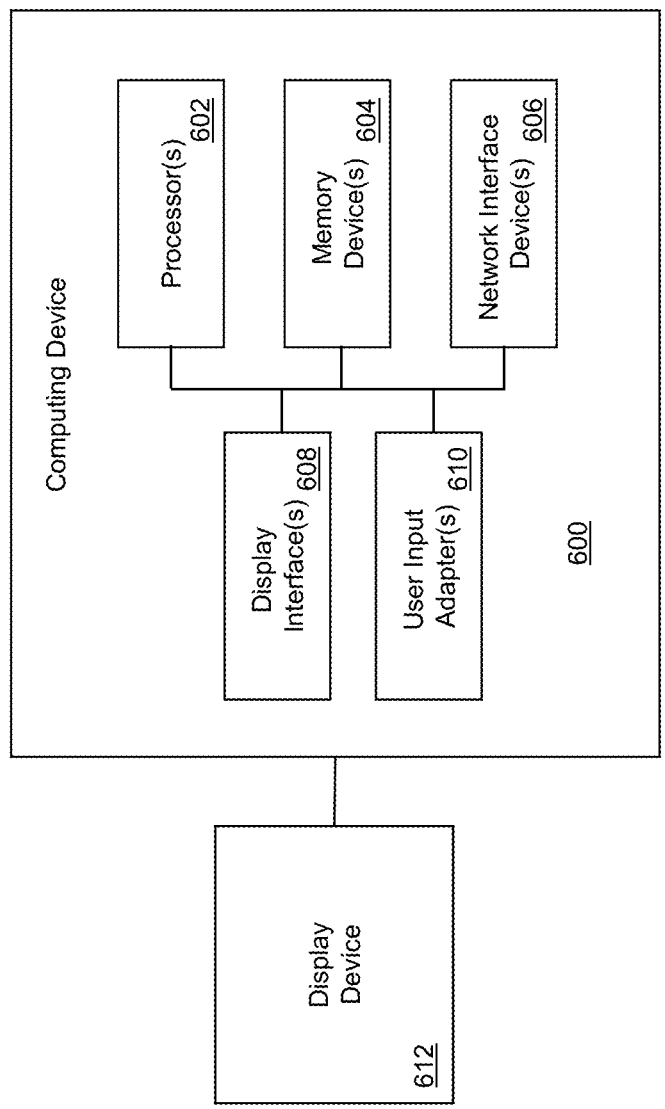
FIG. 6 shows an example computing device that may be used in some embodiments to implement features described herein.

FIGS. 1 and 2 respectively show an exchange computer system and an analysis computer system that is programmed to analyze (e.g., retrospectively) a timeline of order book actions according to certain example embodiments. FIG. 3 shows an example of a data structure that is analyzed by the system in FIG. 2. The data structure includes timestamps for each action that modifies an order book and some of the actions also store a snapshot of the state of the order book at that point in time. FIG. 4 shows a process that may be executed by the computer system shown in FIG. 2. FIG. 5 shows a resulting report or display screen that may be generated using the process shown in FIG. 4. FIG. 6 shows an example computing device that may be used in some embodiments to implement features described herein.

In many places in this document, software modules (also referred to as computer programs or an "engine") and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 6.

Description of FIG. 1

By way of introduction, FIG. 1 shows a block diagram of an example embodiment of a computer-implemented trading exchange system (exchange) 100 that communicates with client systems 102 and external system 112. Client systems 102 can be implemented using a personal computer, PDA, cell phone, server computer, or any other system/device configured to electronically communicate with the exchange 100.

Example client system 102 transmits electronic data messages that include a data transaction request. One example of a data transaction request is an order (order 103). An order may include and/or specify a clientID that identifies the client sending the request, a transaction type ID that may identify, for example, whether the request is associated with a sell or buy instruction (for example 0 for buy and 1 for sell), a typeID that may identify a particular instrument (e.g., a ticker symbol), a quantity value that indicates how much is to be traded by the exchange, an indication if this order is to be an IOC (immediate or cancel) order. An IOC order is an order that will either immediately execute (e.g., match) against orders that are resting in order book 108 or be cancelled. In other words, if no match is found then the amount for the IOC order will not be added to the order book 108 for other future orders to match against, instead it will just be canceled.

When the network interface 104 (which may be network interface 618 in FIG. 6) receives the electronic data message containing order 103, the network interface 104 verifies the integrity of the electronic data message and/or order 103 and then relays the received order and/or electronic data message to matching engine 106.

Matching engine 106 may be software that is executed on one or more hardware processors (e.g., processors 602 of processing system) that are programmed or configured through the software. In certain examples, the matching engine 106 is implemented by one or more ASICs or other specific hardware. Upon receiving an order, the matching engine 106 determines the type of data transaction request (e.g., whether a buy order or a sell order). Responsive to this determination, matching engine 106 accesses order book 108 and attempts to match the incoming order to a pending order in order book 108.

Order book 108 is stored in electronic memory (e.g., cache memory, RAM, non-volatile memory, and/or other types of a storage and/or combinations thereof) that is accessible by the matching engine 106 and includes at least one list (some embodiments may include two or more lists) of electronic data messages or orders. The lists may be sorted by using a price/time technique or other ordering technique. Each typeID (e.g., ticker symbol) that may be acted upon by the exchange 100 may have its own independent order book. Thus, order book 108 may be a collection of order books (e.g., multiple data structures) that are stored by exchange 100. In the example shown in FIG. 1, order book 108 is divided into two sides (side x and side y, which may be buy and sell sides) that are each sorted by price/time. Accordingly, "Order m" in FIG. 1 is at the "top" of order book 108 on side x (e.g., the lowest price at the earliest time) and will typically be filled before other smaller or later orders on side x. Conversely "Side y" may be sorted from the highest price to the lowest price.

Upon receiving a new electronic data message and/or the order therein, matching engine 106 attempts to match the incoming order against one or more contra-side orders in order book 108. For example, if the new order is on side X, then the matching engine 106 will attempt to match the new order against those orders on side Y (e.g., side Y being the contra side of side X) of the order book 108. In certain instances, if no match is found, then matching engine 106 stores the new order to the order book 108. However, as discussed herein, some types of orders (such as IOC orders) will cause exchange 100 to cancel the new order if no match is found such that the new order (e.g., one with an IOC attribute) is not added to the order book 108. In certain instances, the order may be added to the order book 108 and then immediately canceled. In this type of implementation, there would be two "actions" or state changes to the order book 108. A first action that adds the IOC order to the order book 108 and a second that cancels that order. In certain instances, this may be an atomic operation on the part of the exchange so that it is not possible for another order to be processed between these two actions.

In the case of finding a match (or otherwise modifying the order book), the matching engine 106 communicates the details of the match to external systems 112 (or other computing nodes) via network interface 110 (e.g., which also may be network interface 618). External systems 112 can include computer systems that handle settlement, clearing, trade confirmation, and/or computer systems that format and send data streams related to activity in the order book 108. Another external system, as detailed more fully in FIG. 2, is an analysis computer system programmed to assess (e.g., retrospectively) the time stamped changes to the order book (e.g., to determine if an order that was not matched, could have been matched).

Description of FIG. 2

FIG. 2 shows an example analysis computer system 200 according to certain example embodiments. Analysis computer system 200 may be one of many different external systems 112 shown in FIG. 1. In certain example embodiments, the analysis computer system 200 is hosted on a cloud-based platform (e.g., Amazon Web Services or the like).

Analysis computer system 200 receives, via network interface 204, a data feed 202 from exchange 100. In certain example embodiments, the data feed 202 is provided on a real-time basis. In certain example embodiments, the data feed 202 is provided on a daily basis (e.g., at the conclusion of an operating time of Exchange 100) and in a bulk format. The data feed 202 may include the data structure 300 shown in FIG. 3 (or result in data structure 300 being provided to system 200).

The information included in the data feed 202 is saved to database 206 to be accessed by analysis engine 208. The analysis engine 208 may be software executed on one or more hardware processors (e.g., processors 602 of a processing system) that are programmed or configured through the software. In certain examples, the analysis engine 208 is implemented by one or more ASICs or other specific hardware. In certain examples, there are multiple instances of an analysis engine that may be created and hosted on computer system 200. For example, each instance of analysis engine 208 may be associated with a specific client identifier that is used to analyze orders previously submitted by that client. Each instance of analysis engine 208 may, in turn, be hosted on a virtual machine (or virtual container) that executed on a computer system.

In certain example embodiments, each analysis engine may be assigned to one of the worker instances described in co-pending application "METHODS AND SYSTEMS OF SCHEDULING COMPUTER PROCESSES OR TASKS IN A DISTRIBUTED SYSTEM," U.S. application Ser. No. 15/896,857, the entire contents of which are hereby incorporated by reference. In other words, the analysis engine 208 may run on a virtual machine (e.g., a worker instance) instance that is managed by a cloud computer system.

In certain examples, database 206 stores a central or master copy of the data feed 202 received from exchange system 100 and each instance of the analysis engine 208 accesses database 206. In other examples, each worker instance as described in the above mentioned co-pending application stores a copy of the data structure that is to be analyzed. In certain examples, database 206 stores a complete data structure for a trading day provided by exchange system 100 and each instance of an analysis engine copies a portion thereof for analysis thereby.

Once the analysis engine 208 has completed its analysis, the output is provided to network interface 204 that may then communicate the output to client systems 102 in the form of report 210. In certain examples, the report 210 is a static file (e.g., a PDF). In certain examples, the report 210 is provided in the form of an interactive web page. In certain examples, the output from the analysis engine 208 may be saved to a database (e.g., database 206) that is coupled to the system 200. Client systems 102 may then retrieve reports 210 on as needed or on demand basis.

Description of FIG. 3

FIG. 3 shows an example dynamic data structure 300 that may be analyzed using the system shown in FIG. 2 according to certain example embodiments. The data structure may be considered dynamic because entries may be continuously modified, deleted, or added to the data structure.

Each entry 302-314 includes a timestamp A and an action B. Certain entries may also include a snapshot C of the order book (both the buy and the sell sides of the order book) at the time of the entry. Order book snapshots may be included for "ADD" actions, but such snapshots may not be included with "EXECUTE" (EXEC) or "CANCEL" (CNCL) actions. By not including a snapshot for these actions, the amount of memory or storage needed to perform the process shown in FIG. 4 may be decreased. In the case of EXEC and CNCL actions, these are included to determine why a given order "missed" on liquidity that was previously present within the order book. The state of the order book may thus not be needed for these entries. In certain example embodiments, the order book snapshot may be further reduced by only including one side of the order book. The side that is included may be based on which side the "ADD" action is associated. Thus, for example, if a buy order is being added to the order book (e.g., 304), then the buy side of the order book may be included in the snapshot and the sell side may not be included for that particular entry in the data structure.

Accordingly, a snapshot may include data from one or both of the "sides" of the order book. A snapshot may include all or only some of the order book for a given side (e.g., only the top 5 price levels of the order book may be included). A snapshot may include order book data in aggregate form (e.g., the quantity at each price level is aggregate from all orders at a given price level) or may include all orders for each (or some) price levels.

In certain example embodiments, other actions that affect the order book beyond the above three actions (EXEC, CNCL, ADD) may be used. In certain examples, actions that do not directly affect the state of the order book may also be included.

Returning to FIG. 3, entry 302 in data structure 300 includes timestamp 302A of 11:47:11:00, an action of "ADD," to the buy side, an order for 25 @ 98. The snapshot 302A (e.g., the state of the order book for timestamp 302A), includes, on the buy side, 3 total orders, with a total quantity, at 98. On the sell side there is 1 order for 100 at 101. In the example shown in FIG. 3, the snapshot of the order book 302C includes the quantity that was added (25 @ 98). Accordingly, prior to entry 302, the order book included 2 orders, with 75 total quantity @ 98 on the buy side.

Progressing through entries 304-314 of the data structure 300, at 304, 50 @ 98 is added to the buy side with action 304B at timestamp 304A, thus resulting in snapshot 304C. Entry 306 indicates that 50 of the 100 @ 98 on the buy side is canceled at timestamp 306A. This effectively leaves, on the buy side, 2 orders and 50 total quantity at 98 and 1 order of 50 at 99. However, as the action at entry 306 is a cancel action, a snap shot of the order book is not included in the data structure. In certain example embodiments, however, a snap shot may be saved for such an action.

Entry 308 shows, at timestamp 308A, an execute action 308B. This particular action is the result of a sell market order for 50. This effectively means that 50 @ 99 will be removed from the buy side (e.g., to match against the sell side market order). Again, like entry 306, a snapshot of the order book is not saved for entry 308. However, in certain examples, such a snapshot could be included.

Entry 310 shows, at timestamp 310A, another add action 310B to the buy side for 50 @ 97. This entry includes a snapshot 310C of the order book. Entry 312 shows, at timestamp 312A, a cancel action 312B that cancels 50 on the buy side @ 97. This effectively removes the 50 that was added per entry 310.

Entry 314 is an add action 314B that is caused by an IOC, immediate or cancel, order provided at timestamp 314A. In certain examples, IOC orders may be identified based on an attribute field that is included with the order (e.g., the IOC order may be a type of add order). The action 314B is an IOC buy order for 100 @ 99. Entry 314 also includes order book snap shot 314C.

While order book snap shots may be shown in aggregate in some instances (as shown in FIG. 3), the snapshots may also include a more detailed version of the order book that includes individual orders as opposed to aggregated orders.

Description of FIG. 4

FIG. 4 is a flow chart showing a process that may be implemented on the analysis computer system shown in FIG. 2 according to certain example embodiments. The purpose of the process shown in FIG. 4 is to take an order book timeline data structure (e.g., a complete order book timeline) for a given instrument (e.g., a ticker symbol) and go back in time to identify entries that are associated with IOC actions. When an IOC action is found within an order book timeline, then the process analyzes every order within a time window of the IOC order to determine if that IOC order could have partially or wholly matched had it been submitted at a different point in time.

For purposes of explanation, the functionality included in steps 404-420 will be discussed with reference to data structure 300 and entries 302-314.

At step 400, an IOC order (entry 314) is retrieved from data structure 300. In certain example embodiments, this may include searching the data structure 300 for entries that are associated with IOC orders. In certain example embodiments, step 400 may be triggered by the reception of a data message from exchange 100 that an IOC order has just been processed (and failed to match). In other words, the process shown in FIG. 4 may run as a batch process that executes against a complete data structure from a full day of trading or may run on an on-demand basis as each new entry is communicated to the server 200. In certain example embodiments, the process described in FIG. 4 may also run on exchange 100. In certain example embodiments, IOC orders that were partially matched may be used. In such cases, a partial match bit may be set to true (thus effectively skipping step 414 described below) and the process may then determine if a full match is possible.

In any event, when the next IOC order is retrieved, then at step 402, an analysis window is determined. In this example, the window ends after entry 302 (e.g., the window extends from timestamp 314A back to timestamp 302A). It will be appreciated that for a whole trading day there may be thousands or millions of entries in data structure 300 for a given instrument (e.g., ticker symbol). One way to narrow down the processing complexity is to retrieve a subset of the entries from the data structure that are within a predetermined range. For example, the process may retrieve all entries that are within 50 milliseconds (or just those that are 50 ms earlier in time) of the IOC order. In certain examples, this may include retrieving any entry was entered within 50 milliseconds before the IOC order. In certain examples, this may include retrieving entries enter 50 milliseconds after entry of the IOC order. In certain examples, the process may retrieve a certain number of entries before and/or after the given IOC entry. For example, the window may retrieve 200 previous entries. In certain examples, the window that is used to retrieve entries may be configurable or settable by a user, client, or administrator. For example, a first client may wish the process to run by taking into account all entries submitted within 100 milliseconds. A second client may wish the process to run for all entries within 20 milliseconds. And a third client may wish the report to run for the 500 previous entries. In any event, at step 402, the analysis window is determined and the subset of entries from the data structure 300 to be analyzed is set. In certain examples, those entries may be copied to local computing resources or into the processing space of a worker instance.

At step 404 and for the IOC order retrieved at 400, the process begins to iterate over the timeline of entries (e.g., as shown in FIG. 3). It begins by retrieving the next order back along the time line of entries. During the first loop iteration, referring back to the data structure in FIG. 3, step 404 retrieves entry 312. As part of this iterative analysis of the data structure, the process moves to step 406 where the end of the window has not been reached so the process proceeds to step 408 to further analyze the current entry.

At step 408 and 410, the process determines if the action 312B is an "ADD" action. In this case it is not (312B is a cancel action), and the process loops back to step 404 where the next entry, 310, is retrieved.

As the action 310A for entry 310 is an "ADD" action, the process moves to step 412 because no full match has been found. Specifically, the process shown in FIG. 4 includes a flag or other bit that keeps track of determination of full and partial matches. These bits represent if the IOC order (e.g., set at step 400) could have been fully matched and/or partially matched.

At step 412, the process determines if a full match is possible between the IOC order at entry 314 (Buy 100 @ 99) and the order book snapshot 310C of entry 310. In certain example embodiments, a full match may include matching all of the quantity of the IOC order. For example, if an order for 100@10 is received, then a full match would be one in which all 100 of the order is matched (e.g., at the price 10). In the example in FIGS. 3 and 4, the buy 100 @ 99 cannot match against any of the quantity on the sell side for the order book snapshot at 310. Thus, a full match is not possible so the process proceeds to step 414 to determine if a partial match is possible. However, a partial match is also not possible so the process returns to step 404 to retrieve the next entry. In certain examples, a partial match may include matches where only some part (e.g., less than 100%) of the IOC order is identified as being able to match.

The next two entries, 308 and 306, are not associated with an "ADD" action and accordingly the process loops over these entries until entry 304 is retrieved.

With entry 304 as the current entry, the process determines that the action is an "ADD" action. It then moves to step 412 where a full match is not possible because only 50 @ 99 is offered on the buy side. However, a partial match is possible and is determined at step 414.

Upon determination that a partial match is possible, the process proceeds to step 416 and retrieves the closest entry that came after entry 304 that also removed the quantity that could have allowed a match. In this case, that is entry 308 at timestamp 308A where a sell market order removed the 50 @ 99. This information is recorded (e.g., the quantity that could be matched) along with a delta (7 ms) between the timestamp of the IOC order and the entry that caused the removal of the liquidity at step 418. At step 420 the type of action that removed the liquidity (e.g., an Execute action or another sell order) and the amount that was removed is also recorded.

The process returns to step 404 to look through the remaining orders to determine if a full match could have been possible. However, in this example, no full match is found. Accordingly, the output from the process for the data structure 300 may be a record stored in database 206 that if the IOC order (at entry 314) to sell 100 @ 99 had come in at 11:47:10:06, it could have matched for 50 instead of not matching at all. This information may be stored in database 206 (e.g., a results data structure) and/or compiled into a report 210 that is provided to client computer systems 102.

If the entries continued beyond 302 (e.g., order book entries that occurred before 302) and those entries were in the window (determined in step 402), then the process would continue looking for a full match.

Example Pseudo Code

Example pseudo code for analyzing a data set according to certain example embodiments includes the following:

```
1) While there are still entries in the data structure{
   2) Select the next entry from the data structure;
   3) If the current entry is an IOC order that was received and was not matched
   (or only partially matched), then
      4) Set the entry as the CurrentIOCEntry;
      5) Select TimeWindow (a collection of orders from the data structure that
      are within a time window) for the CurrentIOCEntry;
      6) While there are still entries within the TimeWindow OR (partialMatch ==
      false AND fullMatch == false) {
         7) Select the NextEntry that is within the TimeWindow;
         8) If NextEntry includes "ADD" action {
            9) If fullMatch == false && If a match is possible between NextEntry
            and CurrentIOCEntry, then {
               10) StoreMatchDetails( ); }
            11) Else If partialMatch == false && If a partial match is possible
            between NextEntry and CurrentIOCEntry, then {
               12) StoreMatchDetails( ); }
            13) } // Close If "ADD"
      14) } // Close While Loop at 6)
   15) } // Close If at 3)
16) } // Close While Loop at 1)
```

The pseudo code for the StoreMatchDetails( ) function may operate as follows:

1) Moving forward in time from NextEntry to select the entry (RemoveLiquidityEntry) that removed the liquidity that causes the match;
2) Store the time delta (e.g., 7 ms in FIG. 3) between the CurrentIOCEntry (e.g., 314 in FIG. 3) and the RemoveLiquidityEntry (e.g., 308 in FIG. 3);
3) Store the Action (e.g., if an exec or cancel) of the RemoveLiquidityEntry (or alternatively store the RemoveLiquidityEntry entry or a pointer thereto);
4) Store the quantity that could have been matched between the CurrentIOCEntry and the state of the order book prior to removal of liquidity via the RemoveLiquidityEntry (e.g., 50 in FIG. 3).

At the completion of the above functionality the process will (if possible) produce data on a full match, when that full match could have occurred, the next action that caused the potential full match not to occur (e.g., if an EXEC or CANCEL), and the amount removed as a result of the action that prevented the full match from ultimately occurring. The process will also produce (if possible) similar data for an identified "partial match." In certain example embodiments, the process may be modified to find more than one partial match or to find a partial match that would match the "most" amount of quantity.

Description of FIG. 5

FIG. 5 is a screen shot of an example report 500 that may be generated using the process shown in FIG. 4 according to certain example embodiments. The top graph portion 502 shows the total amount (e.g., in shares) of "missed" opportunities within a given time period (e.g., 10 minutes) for a specific instrument. In certain example embodiments, the graph is prepared on a client basis and shows all missed opportunities for all instruments for which trades were missed for a given client. Thus, for example, line 508 shows that a total of a little more than 40,000 shares in potential trades were "missed" between 2:50 PM and 3:00 PM. The results shown in the top graph portion 502 may be thus be derived (e.g., a sum total of shares for which matches were missed) from individual missed opportunities that are detected within a given time window.

The bottom graph portion 504 of FIG. 5 includes elements (e.g., each dot) that represent individual missed opportunities. A user can select a dot 510 and a popup or overlay window 506 may be displayed that shows the details of the missed opportunity. This information may include details from the StoreMatchDetails( ) function discussed above. For example, the number of shares that could have been traded and time period by which the potential trade was missed may be shown in the overlay window 506.

As noted herein, the chart may be generated as, for example, a PDF, a web page, an image, part of a presentation (e.g., a power point presentation), or other visual format. In certain examples, the data underlying the report may also be generated (e.g., as a spread sheet).

Description of FIG. 6

FIG. 6 is a block diagram of an example computing device 600 (which may also be referred to, for example, as a "computing device," "computer system," or "computing system") according to some embodiments. In some embodiments, the computing device 600 includes one or more of the following: one or more processors 602; one or more memory devices 604; one or more network interface devices 606; one or more display interfaces 608; and one or more user input adapters 610. Additionally, in some embodiments, the computing device 600 is connected to or includes a display device 612. As will explained below, these elements (e.g., the processors 602, memory devices 604, network interface devices 606, display interfaces 608, user input adapters 610, display device 612) are hardware devices (for example, electronic circuits or combinations of circuits) that are configured to perform various different functions for the computing device 600.

In some embodiments, each or any of the processors 602 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 602 uses an instruction set architecture such as x86 or Advanced RISC Machine (ARM). Processor 602 is an example of a hardware processor.

In some embodiments, each or any of the memory devices 604 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 602). Memory devices 604 are examples of non-volatile computer-readable storage media.

In some embodiments, each or any of the network interface devices 606 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 608 is or includes one or more circuits that receive data from the processors 602, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 612, which displays the image data. Alternatively or additionally, in some embodiments, each or any of the display interfaces 608 is or includes, for example, a video card, video adapter, or graphics processing unit (GPU).

In some embodiments, each or any of the user input adapters 610 is or includes one or more circuits that receive and process user input data from one or more user input devices (not shown in FIG. 6) that are included in, attached to, or otherwise in communication with the computing device 600, and that output data based on the received input data to the processors 602. Alternatively or additionally, in some embodiments each or any of the user input adapters 610 is or includes, for example, a PS/2 interface, a USB interface, a touchscreen controller, or the like; and/or the user input adapters 610 facilitates input from user input devices (not shown in FIG. 6) such as, for example, a keyboard, mouse, trackpad, touchscreen, etc. . . . .

In some embodiments, the display device 612 may be a Liquid Crystal Display (LCD) display, Light Emitting Diode (LED) display, or other type of display device. In embodiments where the display device 612 is a component of the computing device 600 (e.g., the computing device and the display device are included in a unified housing), the display device 612 may be a touchscreen display or non-touchscreen display. In embodiments where the display device 612 is connected to the computing device 600 (e.g., is external to the computing device 600 and communicates with the computing device 600 via a wire and/or via wireless communication technology), the display device 612 is, for example, an external monitor, projector, television, display screen, etc. . . . . The display device 612 may be used to display the chart shown in FIG. 5 or other similarly generated visual elements.

In various embodiments, the computing device 600 includes one, or two, or three, four, or more of each or any of the above-mentioned elements (e.g., the processors 602, memory devices 604, network interface devices 606, display interfaces 608, and user input adapters 610). Alternatively or additionally, in some embodiments, the computing device 600 includes one or more of: a processing system that includes one or more of processors 602; a memory or storage system that includes the memory devices 604; and a network interface system that includes the network interface devices 606.

The computing device 600 may be arranged, in various embodiments, in many different ways. As just one example, the computing device 600 may be arranged such that the processors 602 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 600 may be arranged such that: the processors 602 include two, three, four, five, or more multi-core processors; the network interface devices 606 include a first network interface device that implements Ethernet and a second network interface device that implements WiFi and/or Bluetooth; and the memory devices 604 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the exchange 100, client systems 102, external systems 112, computer system 200, each of which will be referred to individually for clarity as a "component" for the remainder of this paragraph, are implemented using an example of the computing device 600 of FIG. 6. In such embodiments, the following applies for each component: (a) the elements of the 600 computing device 600 shown in FIG. 6 (i.e., the one or more processors 602, one or more memory devices 604, one or more network interface devices 606, one or more display interfaces 608, and one or more user input adapters 610), or appropriate combinations or subsets of the foregoing) are configured to, adapted to, and/or programmed to implement each or any combination of the actions, activities, or features described herein (e.g., such as those described in connection with FIG. 4) as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 604 (e.g., in various embodiments, in a volatile memory device such as a RAM or an instruction register and/or in a non-volatile memory device such as a flash memory or hard disk) and all actions (e.g., the elements of the process shown in FIG. 4) described herein as performed by the software modules are performed by the processors 602 in conjunction with, as appropriate, the other elements in and/or connected to the computing device 600 (i.e., the network interface devices 606, display interfaces 608, user input adapters 610, and/or display device 612); (c) alternatively or additionally, to the extent it is described herein that the component processes and/or otherwise handles data (such as the data structure shown in FIG. 3), in some embodiments, such data is stored in the memory devices 604 (e.g., in some embodiments, in a volatile memory device such as a RAM and/or in a non-volatile memory device such as a flash memory or hard disk) and/or is processed/handled by the processors 602 in conjunction, as appropriate, the other elements in and/or connected to the computing device 600 (i.e., the network interface devices 606, display interfaces 608, user input adapters 610, and/or display device 612); (d) alternatively or additionally, in some embodiments, the memory devices 602 store instructions that, when executed by the processors 602, cause the processors 602 to perform, in conjunction with, as appropriate, the other elements in and/or connected to the computing device 600 (i.e., the memory devices 604, network interface devices 606, display interfaces 608, user input adapters 610, and/or display device 612), each or any combination of actions described herein as performed by the component and/or by any software modules described herein as included within the component.

Consistent with the preceding paragraph, as one example, in an embodiment where an instance of the computing device 600 is used to implement the computer system 200, the memory devices 604 could load the files associated with the a computer program that is programmed to carry out the steps shown in FIG. 4 and/or the data structure 300. Processors 602 could be used to operate the analysis engine 208, the matching module 106, and/or otherwise process the data described herein.

The hardware configurations shown in FIG. 6 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 6, (e) via other hardware arrangements, architectures, and configurations, and/or via combinations of the technology described in (a) through (e).

Technical Advantages of Described Subject Matter

An order book stores pending data transaction requests (orders) and a matching engine attempts to match new, incoming orders with those already in the order book. In certain instances (e.g., when a match results in a state change of the order book), a data record or entry is generated and added to a data structure that keeps track of all state changes of the order book (e.g., when orders are added and/or removed). In certain instances, new orders will either immediately execute against the order book or be immediately canceled. In other words, for such orders, if a match cannot be immediately identified, the new order may be canceled. A record of this failure may be added to the data structure. In a typical scenario, the cancellation of these immediate orders provides little or no information as to why the order failed to execute. In certain example embodiments, the subject matter herein provides the ability to retrospectively analyze how such orders could have been executed had they been submitted or processed at an earlier point in time. Such information can then be used to further refine how orders are submitted and/or processed to reduce future inefficiencies (e.g., to ensure more matches are identified).

Another technical aspect of the techniques herein relates to how the various different types of entries of the data structure are organized to allow for efficient retrospective processing of the data structure. Specifically, in order to retrospectively analyze the data structure, the state of the order book at the different state changes needs to be known. While saving the complete order book state at each state change is theoretically possible, the resulting storage requirements for such an approach may be prohibitive for efficient processing.

Thus, in certain example embodiments, the order book may be stored in aggregated form and snapshots of the order book may only be stored for when new orders are "added" to the order book. The aggregation, on a per price level basis, may reduce the number of records for each snapshot. And snapshots are only stored with add actions because the retrospective analysis is looking for when a failed order could have been executed against the order book when it was in a different state. In other words, the retrospective analysis may be concerned with when the contra-side of the order book had some quantity to handle the failed order. Thus, by crafting what is included in the data structure, the techniques herein may advantageously improve storage and processing efficiency for such retrospective analysis because not every entry is storing a complete order book snapshot.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIG. 4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

The techniques herein may be applied to a dataset for retrospective analysis (e.g., the analysis of past events). However, the techniques herein may be applied in contexts other than retrospectively. For example, a data set may include non-past event data. For example, the data set may include fictional, arbitrary, or types of non-past data.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
   electronic data storage configured to store a data, structure that includes a plurality of entries that each correspond to a state change in at least one of two ordered lists of data transaction requests, wherein each entry includes a timestamp and an action that caused the state change in at least one of the two ordered lists, where at least some of the plurality of entries include a snapshot of at least one of the two ordered lists at the time of the corresponding timestamp;
   a processing system that includes at least one hardware processor, the processing system configured to:
      (a) select a first entry from the plurality of entries that corresponds to a first data transaction request that at least partly missed in matching against at least one of the two ordered lists;
      (b) iterate, from the selected first entry, back through the plurality of entries of the data structure to locate a second entry in the data structure that includes a snapshot of at least one of the two ordered lists, wherein the snapshot includes data for contra-side data transaction request(s) that could have at least partly successfully matched against the first data transaction request;
      (c) based on the located second entry, retrieve, within the plurality of entries, a third entry that has a timestamp greater than the second entry and includes a third data transaction request that resulted in modification of the at least one of the two ordered lists so that first data transaction request at least partly missed in matching against at least one of the two ordered lists;
      store a time delta between the timestamp in the third entry and the timestamp in the first entry; and
      generate a display that includes data, which is a result of analring the data structure, for multiple time deltas that are each associated with different paired entries from the plurality of entries.

2. The computer system of claim 1, wherein:
   the first data transaction request completely missed in matching against at least one of the two ordered lists,
   the snapshot of the second entry represents a state of at least one of the two ordered lists for which the first data transaction request could have successfully fully matched against.

3. The computer system of claim 2, wherein the processing system is further configured to:
   as part of the iteration, locate a fourth entry that includes a snapshot of a state of at least one of the two ordered lists for which the first data transaction request could have partly, but not fully, successfully matched against.

4. The computer system of claim 3, wherein the timestamp of the fourth entry is between the timestamp of the first entry and the timestamp of the second entry.

5. The computer system of claim 1, wherein each snapshot of a corresponding one of the plurality of entries includes, for two opposing sides, a level parameter, an aggregated quantity of all data transaction requests at each level, and a total number of data transaction requests that make up the aggregated quantity for each level,
   wherein the third data transaction request caused removal of at least some of the aggregated quantity at a level associated with the third data transaction request.

6. The computer system of claim 5, wherein the processing system is further configured to, in response to retrieval of the third data transaction request, store:
   a quantity amount removed from the aggregated quantity value as a result of execution of the third data transaction request; and
   a data transaction request type for the third data transaction request that caused the removal of the quantity amount.

7. The computer system of claim 6, wherein the data transaction request type includes one of an execute data transaction request type and a cancel data transaction request type.

8. The computer system of claim 1, wherein the second entry is located, at least in part, based on being an add data transaction request type that is a type that adds quantity to at least one level of at least one of the two ordered lists.

9. The computer system of claim 1, wherein snapshots of the two ordered lists are only stored for those entries that add quantity to at least one of the two ordered lists.

10. The computer system of claim 1, wherein a second entry is only located if within a time window that is based on the timestamp of the first entry.

11. The computer system of claim 1, wherein the computer system is a cloud-based distributed system that is configured to execute a plurality of instances where each instance is configured to execute (a), (b), and (c) on a per client identifier basis using hardware processing resources of the cloud-based distributed system.

12. A method implemented on a computer system for analyzing a data structure, the method comprising:
storing, to a non-transitory computer-readable storage medium of the computer system, a data structure that includes a plurality of entries that each correspond to a state change in an ordered list, the ordered list including a plurality of data transaction requests, where each entry includes a timestamp and an action that caused the state change in the ordered list, where at least some of the plurality of entries include a snapshot of the ordered list at the time of the corresponding time stamp;
obtaining, by using at least one processor of the computer system, a first entry from the data structure, the first entry corresponding to a first data transaction request that did not match against any other transaction request in the ordered list;
selecting, by using the at least one processor of the computer system, a second entry from the data structure that includes a snapshot of the ordered list for a corresponding data transaction request that caused the state change to the ordered list, wherein the snapshot includes data representing contra-side data transaction request(s) that could have at least partly successfully matched against the first data transaction request;
based on the selected second entry, locating, within the plurality of entries, a third entry that has a timestamp that is between the timestamp for the first entry and the timestamp for the second entry, the third entry including a third data transaction request that resulted in modification of the ordered list so that the first data transaction request did not match against data transaction requests contained in the ordered list; and
storing, to the non-transitory computer-readable storage medium, 1) a time delta between the timestamp of the first entry and the timestamp of the third entry, 2) the action associated with the third entry, and 3) an amount associated with the third entry.

13. The method of claim 12, wherein snapshots of the ordered list are only stored for those entries that add quantity to the ordered list.

14. The method of claim 13, wherein selection of the second entry is further based on the second entry including a specific action type associated with adding quantity to the ordered list.

15. The method of claim 13, wherein:
the ordered list includes a first side and a second side,
data for the snapshots includes aggregated quantity amounts for each level of each of the first and second sides of the ordered list, and
the first data transaction request was configured to match against the second side.

16. The method of claim 15, wherein the third data transaction request that caused removal of at least some of the aggregated quantity from the second side of the ordered list is at a level that is associated with the third data transaction request.

17. The method of claim 12, wherein the first data transaction request included a request for matching a quantity and none of the quantity of the first data transaction request was matched against the ordered list, and
the snapshot included in the second entry represents a state of the ordered list that contained at least the amount of the quantity of the first data transaction request that could have been successfully matched against.

18. The method of claim 17, further comprising:
selecting a fourth entry that includes a snapshot of a state of the ordered list for which the first data transaction request could have partly, but not fully, successfully matched against.

19. The method of claim 18, further comprising: in response to selection of the fourth entry, analyzing the data structure and selecting the second entry after selection of the fourth entry.

20. A non-transitory computer readable storage medium storing instructions for use with a computer system for processing a data structure, the stored instructions comprising instructions that cause the computer system to:
retrieve, from electronic data storage, a data structure that includes a plurality of entries that each correspond to a state change in at least one of two ordered lists of data transaction requests, wherein each entry includes a timestamp and an action that caused the state change in at least one of the two ordered lists, wherein at least some of the plurality of entries include a snapshot of at least one of the two ordered lists at the time of the corresponding timestamp;
select a first entry from the plurality of entries that corresponds to a first data transaction request that at least partly missed in matching against at least one of the two ordered lists;
iterate, from the selected first entry, back through the plurality of entries of the data structure to locate a second entry in the data structure that includes a snapshot of at least one of the two ordered lists, wherein the snapshot includes data for contra-side data transaction request(s) that could have at least partly successfully matched against the first data transaction request;
based on the located second entry, retrieve, within the plurality of entries, a third entry that has a timestamp greater than the second entry and includes a third data transaction request that resulted in modification of the at least one of the two ordered lists so that first data transaction request at least partly missed in matching against at least one of the two ordered lists; and
store a time difference between a timestamp of the first entry and a timestamp of the third entry.

* * * * *